United States Patent [19]
Ketseoglou

[11] Patent Number: 6,138,260
[45] Date of Patent: Oct. 24, 2000

[54] RETRANSMISSION PACKET CAPTURE SYSTEM WITHIN A WIRELESS MULTISERVICE COMMUNICATIONS ENVIRONMENT WITH TURBO DECODING

[75] Inventor: Thomas J. Ketseoglou, Irvine, Calif.

[73] Assignee: Conexant Systems, Inc., Newport Beach, Calif.

[21] Appl. No.: 09/038,724

[22] Filed: Mar. 10, 1998

Related U.S. Application Data

[63] Continuation-in-part of application No. 08/923,722, Sep. 4, 1997.

[51] Int. Cl.[7] .................. H03M 13/29; H03M 13/41; H04L 1/16
[52] U.S. Cl. ............................. 714/751; 714/795
[58] Field of Search .................. 714/751, 755, 714/786, 795, 794

[56] References Cited

U.S. PATENT DOCUMENTS 5,907,582   5/1999   Yi .................................. 375/259

OTHER PUBLICATIONS

Narayanan et al., "A Novel ARQ Technique using the Turbo Coding Principle", IEE Communications Letters, vol. 1, No. 2, Mar. 1997, pp. 49–51.

Narayanan et al., "Physical Layer Design for Packet Data over IS–136", IEEE 47th Vehicular Technology Conference, May 4–7, 1997, pp. 1029–1033.

*Primary Examiner*—Stephen M. Baker
*Attorney, Agent, or Firm*—Price, Gess & Ubell

[57] ABSTRACT

A "hybrid" ARQ system within a multiple access wireless communications environment is provided for recombining ARQ retransmission signals with information obtained from corresponding previously failed transmissions of the same signal which had been sent and received within the air interface. Forward Error Correction (FEC) is implemented within an ARQ environment by using whatever acquired information has been previously obtained from Rake processed transmitted and retransmitted signals and trying to correct the information by combining the signals and without retransmission. In a second preferred embodiment of the present invention, Turbo encoded transmitted information is only partially re-transmitted by the transmitter in order to achieve a successful transmission.

5 Claims, 6 Drawing Sheets

FIG. 1

RETRANSMISSION PACKET CAPTURE SYSTEM WITHIN A WIRELESS MULTISERVICE COMMUNICATIONS ENVIRONMENT WITH TURBO DECODING

RELATED APPLICATION

This application is a continuation-in-part of U.S. patent application Ser. No. 08/923,722 for RETRANSMISSION PACKET CAPTURE SYSTEM WITHIN A WIRELESS MULTISERVICE COMMUNICATIONS ENVIRONMENT by Thomas J. Ketseoglou filed Sep. 4, 1997.

FIELD OF THE INVENTION

The present invention relates generally to wireless communication systems, and more particularly, to a system and method for correctly transmitting and re-transmitting data packets in a wireless multi-media communications environment.

BACKGROUND OF THE INVENTION

Various bodies worldwide are currently developing standards for the specification of the next generation of mobile telecommunications systems. Services offered by current wireless mobile systems are telephony and voice services supported by narrowband digital networks. There will be a demand for higher bandwidth services as more comprehensive data and information is transmitted. This comprehensive data will require mobile systems to interface with hardwired broadband networks using asynchronous transfer mode (ATM) transmission (defined below). Thus, today's wireless interface must carry narrowband services effectively while providing the flexibility to carry higher bandwidth services as the demand increases.

However, the harmonization of multiple communication services with different characteristics results in distinguishable spectrum and transmission needs. Representative services used on wireless communication networks include telephony, videotelephony, and high-speed data transmission. These services have varying and distinguishable needs which include being in high demand, being delay critical, requiring high bandwidth, and/or being intolerant of errors. These different services also have different encoding requirements, different error transmission requirements and different delay requirements. The trade-offs of these different requirements of the different services used on the network, when they are integrated into a single cohesive whole, lead to limitations in the ability of the network to transmit a large amount of information quickly, correctly and simultaneously.

The radio access technique most often utilized for these diverse requirements is known as code division multiple access (CDMA). CDMA and ATM characteristics, separately and in combination, offer significant advantages in wireless communication environments where a wide range of services must be carried. Both CDMA and ATM allow a transmission link to support a number of simultaneous connections which can be used on demand to simplify routing and reduce traffic congestion and overhead.

CDMA allows many users to share the same radio frequency spectrum simultaneously through the use of spread spectrum transmission. Each individual connection across the radio interface is distinguished by a CDMA code allocated to that connection. Since there is a relatively large number of codes, they can be allocated to new connections as the connections are set up or when a new mobile station affiliates to a base station servicing multiple users. User data is transmitted over the air interface with an associated CDMA code and without the need for additional channel assignments. Thus, the CDMA code identifies the signal and represents a "virtual" channel connection for the air interface.

A reality of wireless communications is that data is communicated at essentially random times. Additional data may be added to the system and transmitted at any time. These random transmissions may, in the aggregate, force the system capacity to be exceeded and cause interference between users. These dynamically changing traffic characteristics may increase above system limitations and cause unacceptably excessive error rates.

ATM subdivides data for transmission into small fixed size packets called ATM cells which contain groups of information. Each ATM cell includes a data field and a control field which includes an address. The address within the control field can also be considered a virtual channel connection within a fixed network since multiple users are each identified by a separate address allocation. ATM is unlike traditional transmission systems in that it is asynchronous, and only uses network capacity when there is data to be transmitted.

Another communications transfer mode known in the art is time division multiple access (TDMA). TDMA is similar to ATM, with the exception that TDMA is not asynchronous. Each TDMA transmitter sends a "cell" of information each time it is "polled."

In mobile digital information transmission techniques, specifically CDMA, ATM and TDMA, data information is considered to be "bursty" in that significant amounts of data are reduced to "packets" and transmitted in "bursts." Burst mode transmission results in information packages being sent and packetization delays. The process of filling ATM cells with speech also involves packetization delays.

The inherent nature of radio communications, in terms of transmitter power constraints and limited spectrum availability, also restricts the maximum amount of information which is possible to be transmitted over an air interface. Thus, within an air interface, broadband communication services must be regarded as being similar to narrowband services due to the mobile power constraints and the limitations of the data transfer rate on the air interface network. Additionally, radio transmission is significantly more error prone than broadband hard-wired networks. This tends to further reduce capacity due to the necessity to transmit and process error control protocols.

Figure 1:
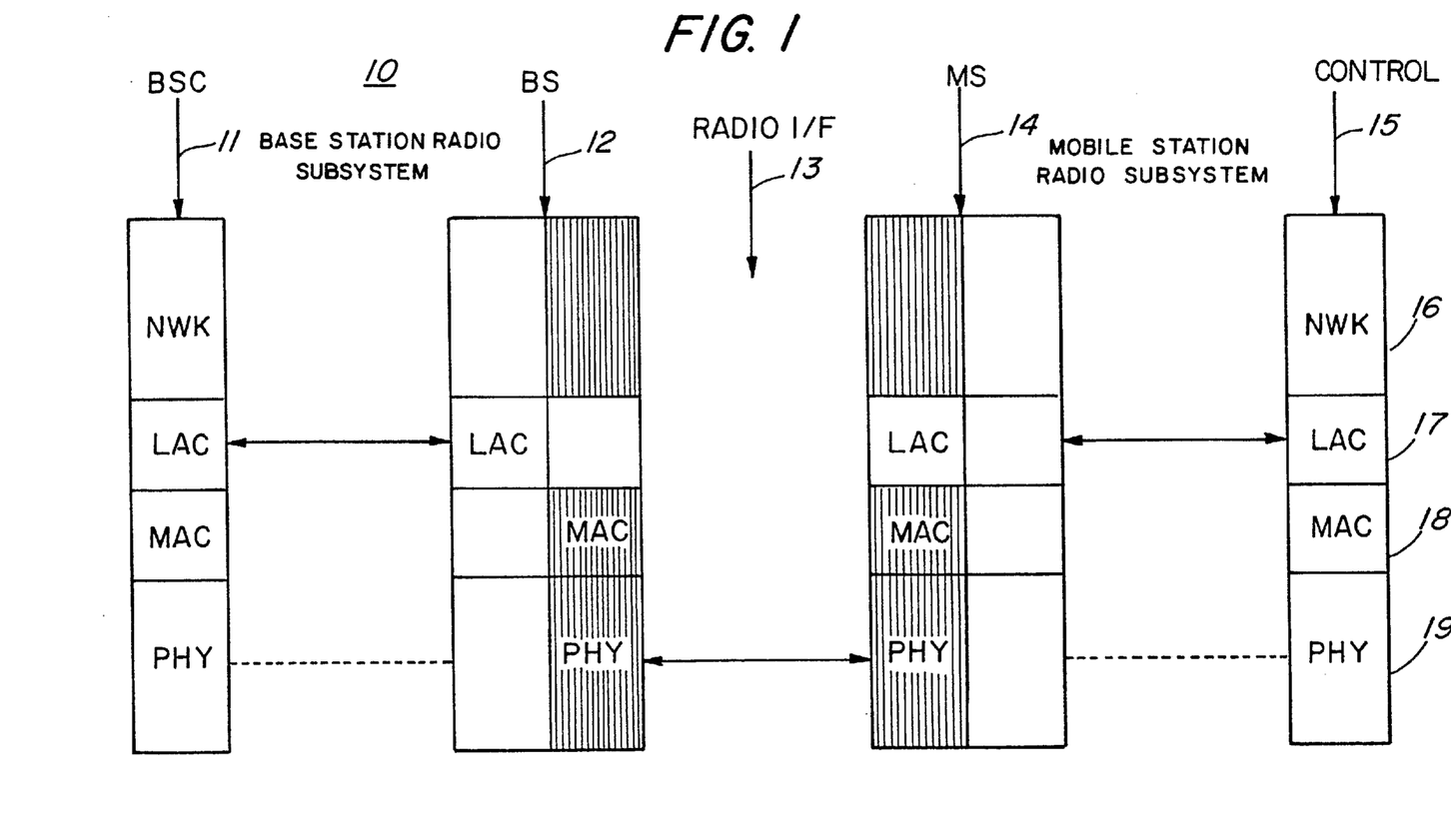
FIG. 1 shows a graphical depiction of the various subsystems of a mobile radio station in conjunction with an associated base station within a multiple access environment under the known IMT-2000 standard.

The standard known in the art which was created by the International Telecommunications Union (ITU) for the wireless multimedia communications environment is known as IMT-2000. FIG. 1 shows a graphical depiction of the various subsystems of a mobile radio station in conjunction with an associated base station within a multiple access environment under the IMT-2000 standard.

In FIG. 1, the base station 12 includes a base station control 11 which controls the base station 12. The base station 12 communicates over a wireless interface 13 to a mobile station 14. The mobile station also includes a mobile station control 15. Each of the systems graphically shown in FIG. 1 includes the following subsystems, an internal network 16, link access control subsystems 17, medium access control subsystems 18, and the physical radio air interface transmission system 19.

Current wireless communication of data, as used and as planned for implementation with IMT-2000, uses a system of error correction and reliability known as "Automatic Repeat Request" (ARQ). ARQ is a strategy of error correction which requests the re-transmission of a packet of data when the transmission is not completely and accurately received.

In ARQ, the receiver provides a signal to the corresponding data packet transmitter that the information data packet was not adequately received. Upon receipt of the ARQ signal, signifying an error in the previous transmission, the transmitter again re-transmits the data packet to the receiver. This process is reiterated until the data packet is adequately received. The receiver is then able to receive the next data packet to be sent.

The ARQ process causes system delays as identical information is transmitted and retransmitted over and over again until the signal representing the data packet is deemed acceptable or is considered to have failed and the transmission of that information data packet is aborted. These retransmissions of identical information add unwanted network traffic causing system degradation and interference.

A transmission standard related to CDMA digital wireless communications is Telecommunications Industry Association (TIA) committee TR45.5 developing IS-95 third generation standards. This telecommunications industry standard recommends that "Turbo coding" be provided for data transmission rates higher than 14.4 Kbps.

Figure 4:
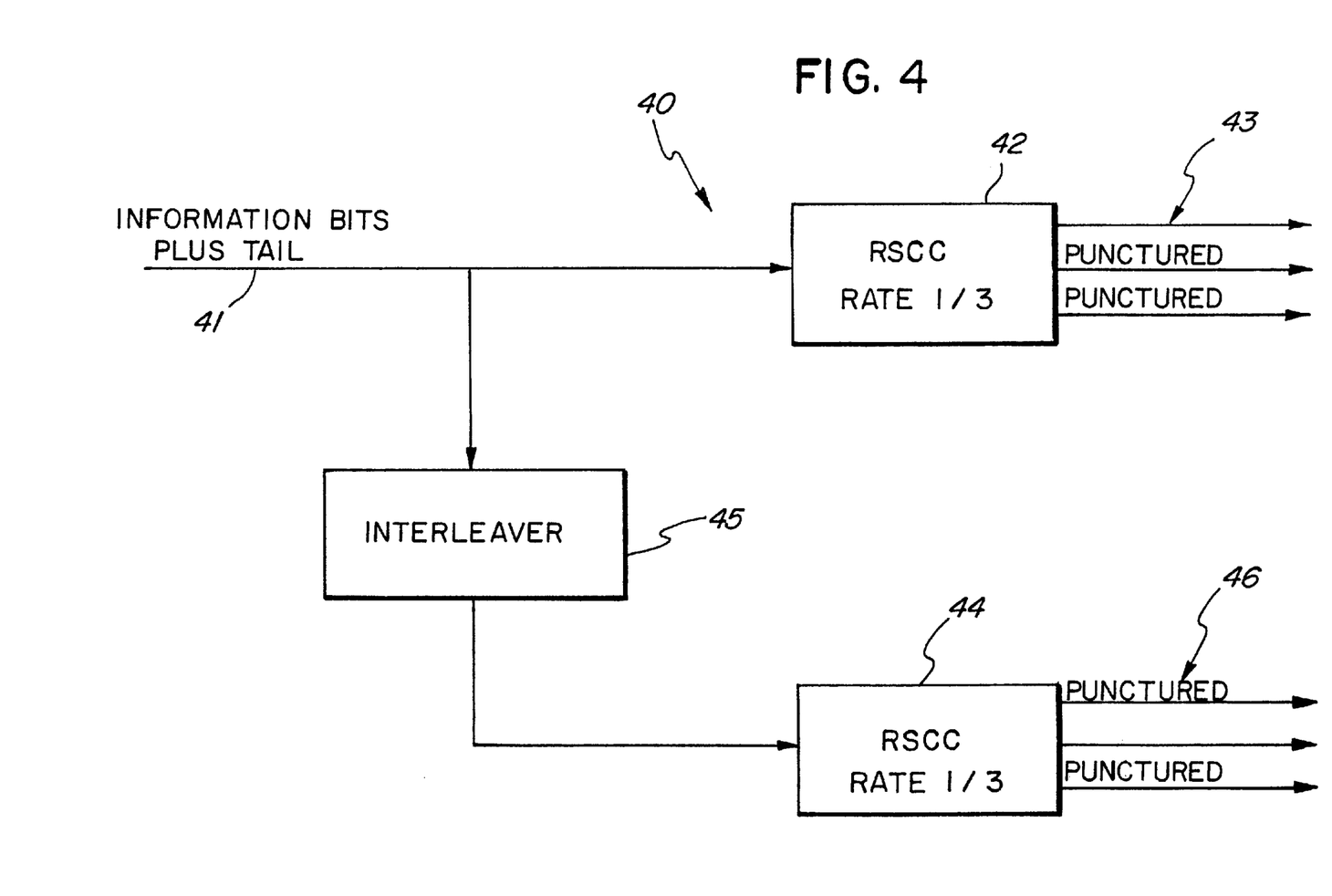
FIG. 4 shows a graphical block diagram depiction of a known implementation of Turbo encoding for transmission.

A known implementation of Turbo encoding is shown in FIG. 4. In the illustrated transmission system, data to be transmitted is input to the encoder 40 at input 41. The data is then processed by a first recursive systematic convolutional coder (RSCC) 42 to provide multiple encoder outputs 43. Each of the set of first encoder outputs 43 is a signal having separately redundant information representative of the data at input 41.

The encoder 40 additionally processes the data at input 41 by sending it to a second RSCC 44 through interleaver 45. Interleaver 45 reshuffles the bits of information at input 41 and sends them to second RSCC 44 in order to minimize the error within the transmission. By reshuffling the data bits, the second set of encoder outputs 46 from second RSCC 44 are in a different order and configuration than at the outputs of first RSCC 42.

In "Turbo coding," the various outputs 43, 46 of the first and second RSCC are then "punctured" or taken from the remainder of the outputs 43, 46 and selected for transmission. Puncturing outputs is acceptable for transmission purposes because of the redundancy of information which is created within the encoder 40. While not described in detail herein, Turbo decoding is also well known in the art.

TIA standard TR45.5 defines several turbo coding rates for use in wireless data communications. Turbo coding rates are a ratio of the information bits being considered over the actual bits being transmitted. These rates are ½ or ⅓ which is derived from a standard rate ⅓ code for the forward link, i.e., a transmission of the base station to the mobile station, and ½ or ⅓ or ¼ derived from a standard rate ⅙ code for the reverse link, i.e., a transmission of the mobile station to the base station.

A higher turbo rate code is beneficial for transmission because less bits are actually being transmitted to convey the same amount of information. By "puncturing" some of the outputs 43, 46, a higher rate code is achieved since less bits are actually transmitted and therefore less hardware is required. Due to the redundancy of information being output from the Turbo encoder, puncturing is acceptable for sending a reliable signal without losing information.

One system architecture utilized in wireless spread spectrum communications is known as pre-combining "rake." In this rake architecture, multiple path parameters for the received signal are derived from a downlink pilot signal and used for phase, amplitude, and time alignment of the various multiple path components which are combined prior to demodulation. Essentially, pre-combining rake recognizes that a single transmitted signal sent over a wireless communications link will have multiple components or "metrics" which must be combined by a receiver to obtain a single accumulated signal input for the Viterbi Algorithm, known in the art.

When the rake architecture is used within wireless communications systems, a transmission is deemed to fail when insufficient multiple path components are received and their combined power level is not above a predetermined threshold.

When the transmission fails, the rake receiver must undertake an error correction system. It transmits an ARQ request. The information signal is then re-transmitted by the transmitter. This process is reiterated until the signal is deemed to be adequately received, i.e., it is above the predetermined power threshold when rake recombination is completed.

However, the addition of multiple transmissions of the same signal adds unwanted traffic within the transmission network. Further, the rake system has power constraints due to multiple users on the network with different power availability. One user's transmission may interfere with the power level of another user's reception.

OBJECTS OF THE INVENTION

It therefore is an object of the present invention to provide an improved system for providing a wireless telecommunications system which will effectively carry narrowband services while providing the flexibility to carry higher bandwidth services.

It is a further object of the present invention to provide a wireless communications system which effectively addresses the differing wireless communications transmission and spectrum needs of multiple services (such as telephony, videotelephony, and high-speed data transmission), including being delay critical, requiring high bandwidth, and being intolerant of errors.

It is yet a further object of the present invention to provide a transmission system within a multiple access wireless communications environment which reduces unnecessary and unwanted information traffic on the network, reduces interference between users, addresses dynamically changing traffic characteristics in a way which provides for gradual degradation of system quality when network traffic limitations are exceeded and thereby reduces unacceptable communications errors.

It is still a further object of the present invention to provide a transmission system within a multiple access wireless communications environment which minimizes the necessary number of ARQ retransmissions of identical information in order to obtain an acceptable signal and thereby reduces unwanted information traffic from the wireless network.

It is still even a further object of the present invention to provide a data transmission system within a multiple access wireless communications environment which provides a lower effective Turbo decoding rate while using a higher Turbo coding rate for transmission.

SUMMARY OF THE INVENTION

These and other objects and advantages are achieved by the present invention by implementing a "hybrid" ARQ system within a multiple access wireless communications environment. The system recombines ARQ retransmission signals with information obtained from corresponding previously failed transmissions of the same signal which had been sent and received within the air interface. The present invention is considered to be "hybrid" ARQ in that it implements Forward Error Correction (FEC) within an ARQ environment by using whatever acquired information it has already obtained and trying to correct the information without further retransmission.

The present invention recognizes that there is a trade-off between the number of ARQ transmissions within a network to obtain a single correct signal, and the interference caused by the re-transmission of the same signal over and over again until the signal is correctly received. The present invention resolves this trade-off by processing the re-transmitted signal with the processed information already obtained from previously received corresponding signals which were transmitted and failed, i.e., they yielded an unacceptable resulting signal.

By combining corresponding re-transmissions, the present invention increases the likelihood that a successful transmission will be quickly achieved. The present invention recognizes that the probability of a successful transmission is geometrically increased as the number of correspondingly similar re-transmissions are combined to obtain a single correct signal.

The combination of re-transmissions also allows the preferred embodiment of the present invention to minimize the number of likely re-transmissions necessary to achieve a successful signal being received, and thereby reduces the information traffic on the network. This further allows an increase in the number of users on the network without excessive degradation of the quality of the transmissions by the gradual increase in users.

In a first preferred embodiment of the present invention, multiple corresponding re-transmissions are combined to recreate the transmitted signal using Rake processing. In this first preferred embodiment of the present invention, multiple transmitted metrics of a first transmission are combined using Rake processing. If the signal is determined to have failed, an ARQ signal is sent to the transmitter and the signal is re-transmitted. Once the re-transmitted signal is received and Rake processed, the first Rake processed signal and the Rake processed re-transmitted signal are then again Rake processed together to obtain a successful transmission. The signal is re-transmitted and Rake combined as many times as necessary until either a successful signal is reached or it is determined to discard the information.

In a second preferred embodiment of the present invention, Turbo encoded transmitted data information is only partially re-transmitted by the transmitter in order to achieve a successful transmission. By re-transmitting only part of the originally transmitted signal, the second preferred embodiment of the present invention effectively lowers the Turbo decoding rate at the receiver in order to allow accurate reception while maintaining a higher Turbo coding rate at transmission and minimizing transmission requirements. The second preferred embodiment of the present invention is able to achieve these advantages by combining Turbo decoding algorithms within the retransmission system of the first preferred embodiment. The second preferred embodiment thus minimizes the use of redundant retransmissions.

BRIEF DESCRIPTION OF THE DRAWINGS

The features, organization, advantages and objects of this invention will be fully understood from the following detailed description and the accompanying drawings. The drawings contained herein are not considered to be accurate depictions of the embodiments of the invention, but are provided for illustrative purposes only and are to be interpreted in conjunction with the attached specification.

DETAILED DESCRIPTION OF THE PREFERRED EMBODIMENTS

The following description is provided to enable any person skilled in the art to make and use the invention, and sets forth the best modes presently contemplated by the inventor for carrying out this invention. Various modifications, however, will remain readily apparent to those skilled in these arts, since the generic principals of the present invention have been defined herein.

The first preferred embodiment of the present invention operates within a rake processing environment. The first preferred embodiment determines when a first packet transmission is not adequately received by a transmitter. When the system determines that the first packet transmission is not adequately received, the receiver stores the resulting failed rake processed signal. An ARQ signal is then sent requiring retransmission of the signal by the transmitter.

The first preferred embodiment then performs rake processing upon the second retransmitted signal. The system combines the previously stored first, failed, rake-processed transmission result with the corresponding second, rake processed retransmission result in an attempt to obtain an adequate signal. If the combined signal is still not adequate, the combined signal result is again stored, and the process is reiterated until a resulting signal is adequately obtained.

The first preferred embodiment of the present invention reiterates the retransmission process until either (1) the resulting processed signal results in an adequate transmission being received, or (2) the system exceeds a default limitation of the number of reiterations allowed and the resulting failed signal is discarded. In the first preferred embodiment of the present invention the maximum number of times, or reiteration threshold, for allowable retransmission of data packets may be set on a per service basis. For example, a voice signal communication will have a lower reiteration threshold than high-speed data since each transmission error will have less of an affect on the outcome.

The first preferred embodiment of the present invention determines if the rake processed received signal is acceptable by testing whether the processed signal has sufficient power to yield an error free result as an input for the Viterbi Algorithm. The system of the first preferred embodiment of the present invention recognizes that the metrics of the transmitted signal take multiple paths across the air interface to the receiver. Due to this inconsistency in the paths of the multiple metrics of a single signal, the rake processing of the metrics may result in an unreliable signal being received. The preferred embodiment recognizes that the power level of the rake processed signal is a likely determinant of whether the signal is reliable in relation to the noise incurred across the air interface.

The first preferred embodiment implements the present invention by combining transmitted and retransmitted signals based upon the following equation:

$$M_n(L) = M_n(L-1) + \Delta m_{n,L}$$

where: M is the accumulation of the soft decision bit metrics resulting from the rake processing of the transmissions, L is the number of the transmission within the multiple corresponding signals being transmitted and retransmitted, n is the number of the bit within the data information packet being transmitted, $\Delta m$ is the incremental, soft decision bit reception metric from the Lth, or last, transmission.

Figure 2:
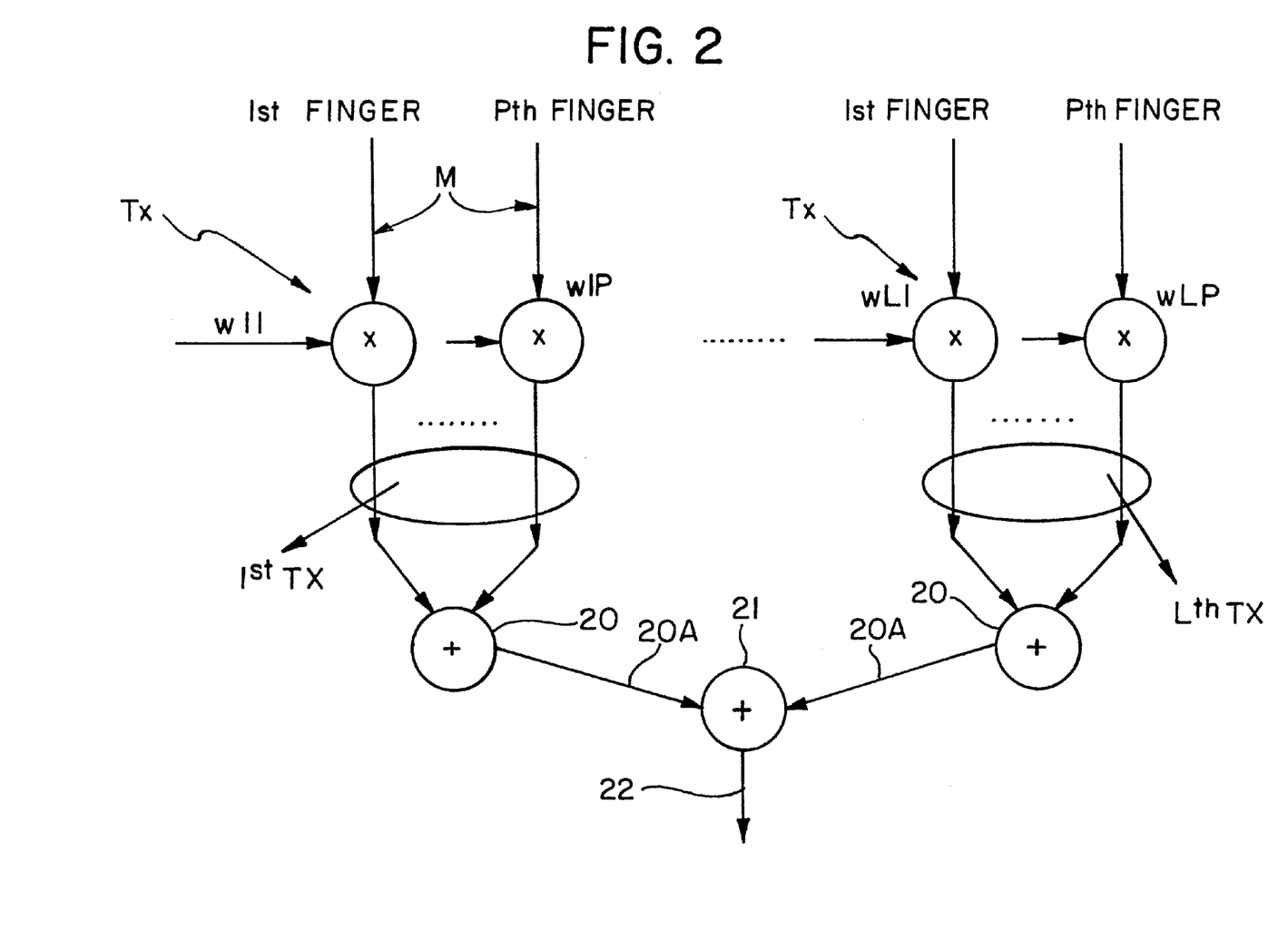
FIG. 2 shows a graphical depiction of the algorithm used by the first preferred embodiment to implement the system of the present invention.
Figure 3:
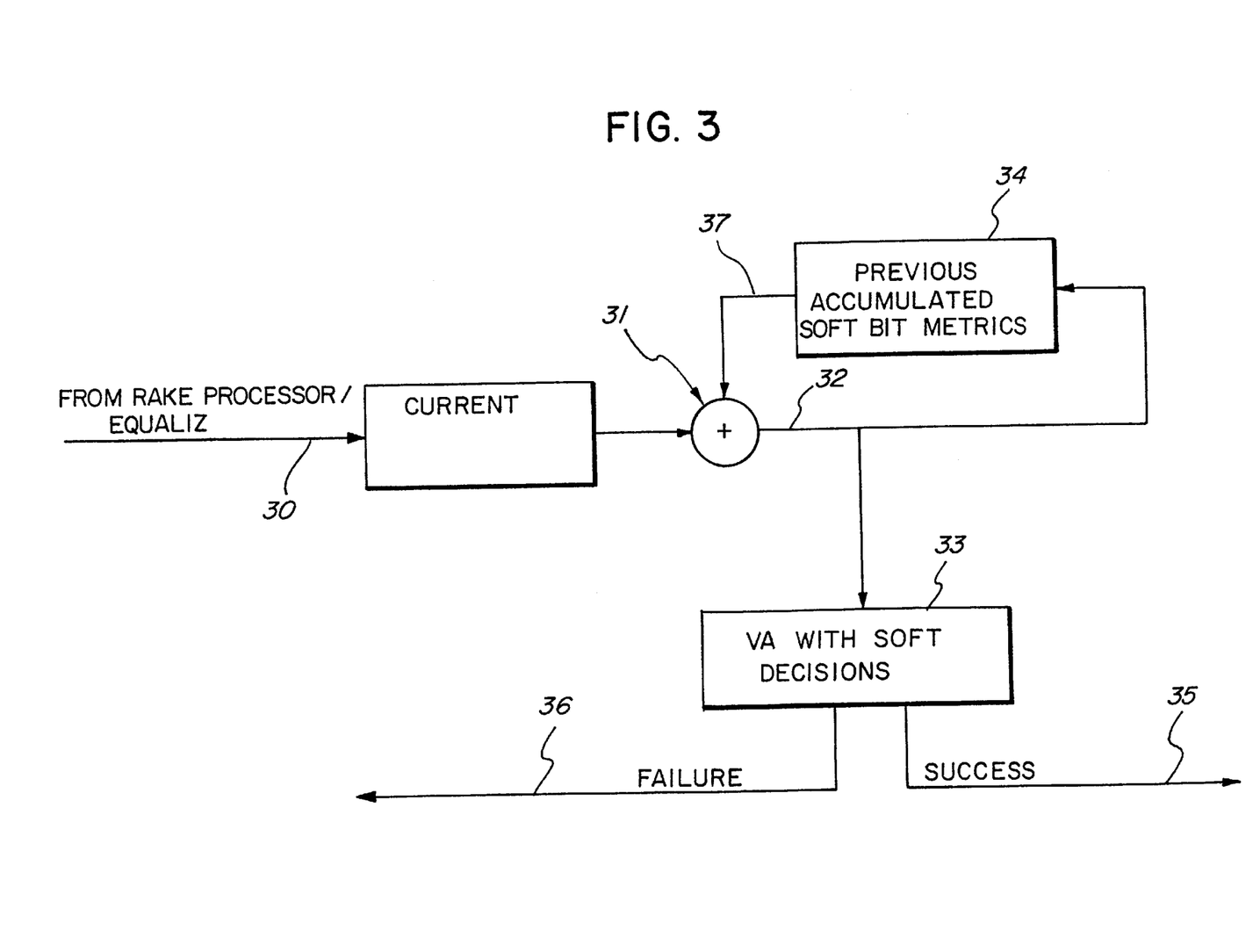
FIG. 3 shows a graphical block diagram depiction of the hardware configuration used to implement the method of the first preferred environment of the present invention as shown in FIG. 2.

FIGS. 2 and 3 show a graphical depiction of the algorithm used by the first preferred embodiment to implement the system of the present invention. As shown in FIG. 2, each transmission TX is comprised of a series of metrics or fingers M. Each of these metrics M symbolizes a different one of the multiple path components of the transmission TX traveling across a different path over the air interface from a transmitter to a receiver.

The reliability of each metric M is determined based upon the path that it takes across the air interface. As shown in FIG. 2, each metric M is weighted by a value W during rake processing to determine the potential value and reliability of its contribution to the result of the overall received signal TX which is to be included within the Viterbi Algorithm. In the rake processing of the metrics M, the weighted metrics M from a single transmission are processed and added together by adder 20 to produce a single resulting outcome 20A which is to be included within the Viterbi Algorithm.

As illustrated by FIG. 2, each of the transmissions TX undergoes identical rake processing by the receiver. The first preferred embodiment of the present invention further adds each of the raked signal outcomes 20A from each of the rake processed individual signals TX together through adder 21 in order to obtain a total combined output signal 22. This output signal 22 is statistically a reliable representation of the transmission TX, based upon the rake processing of each of signals TX, and their rake combination together into a single reliable signal 22 which may be included within the Viterbi Algorithm.

FIG. 3 shows a further graphical block diagram depiction of the hardware configuration used to implement the method of the first preferred environment of the present invention as shown in FIG. 2. Each of the metrics M is rake processed with its counterpart metrics M from each transmission TX.

As shown in FIG. 3, the output representative 20A of each rake processed signal 20 is provided along the input 30. The input 30 is then fed into adder 31. The accumulated output 32 of adder 31 is sent to both memory 34 where it is stored and processor 33 where it is analyzed for processing within the Viterbi Algorithm.

If processor 33 determines that the processed transmission TX has been adequately received, then the representative signal of the transmission is used within the Veterbi Algorithm and sent along output 35 for further processing by the receiver. However, if the processor 33 determines that the output 32 is not an adequately useful signal, i.e., it does not have sufficient power to be representative of an adequate rake processed signal, then an output is sent along output line 36, and an ARQ signal is sent requiring further re-transmission from the transmitter.

The re-transmitted signal is received, rake processed, and the rake processed representative of the re-transmitted signal is again sent along input 32 to adder 31. The rake processed signal 30 is added by adder 31 to the previous accumulated rake processed results sent along line 37. By implementing the shown system for recombining ARQ transmission signals with information obtained from corresponding previously failed transmissions of the same signal which had been sent and received across the air interface, the present invention is able to achieve a reduction in necessary traffic on a multiple access wireless communications network. The preferred embodiments of the present invention are further able to address the different transmission and spectrum needs of multiple services by reducing delay, addressing high bandwidth needs, reducing transmission errors, reducing interference and allowing for the gradual degradation of system quality when network traffic limitations are exceeded.

A second preferred embodiment of the present invention implements Turbo decoding within the re-transmission rake processing environment of the first embodiment shown in FIGS. 2 and 3. In the second preferred embodiment, an originally transmitted and failed signal is only partially re-transmitted in response to the ARQ signal in order to achieve a successful transmission. By re-transmitting only part of the originally transmitted signal, the present invention effectively lowers the Turbo decoding rate to allow accurate reception while maintaining a higher Turbo coding rate at transmission and minimizing transmission requirements.

The second preferred embodiment of the present invention is able to achieve these advantages by combining Turbo decoding algorithms within the retransmission system of the first preferred embodiment. The second preferred embodiment minimizes the amount of information being redundantly retransmitted.

Figure 5:
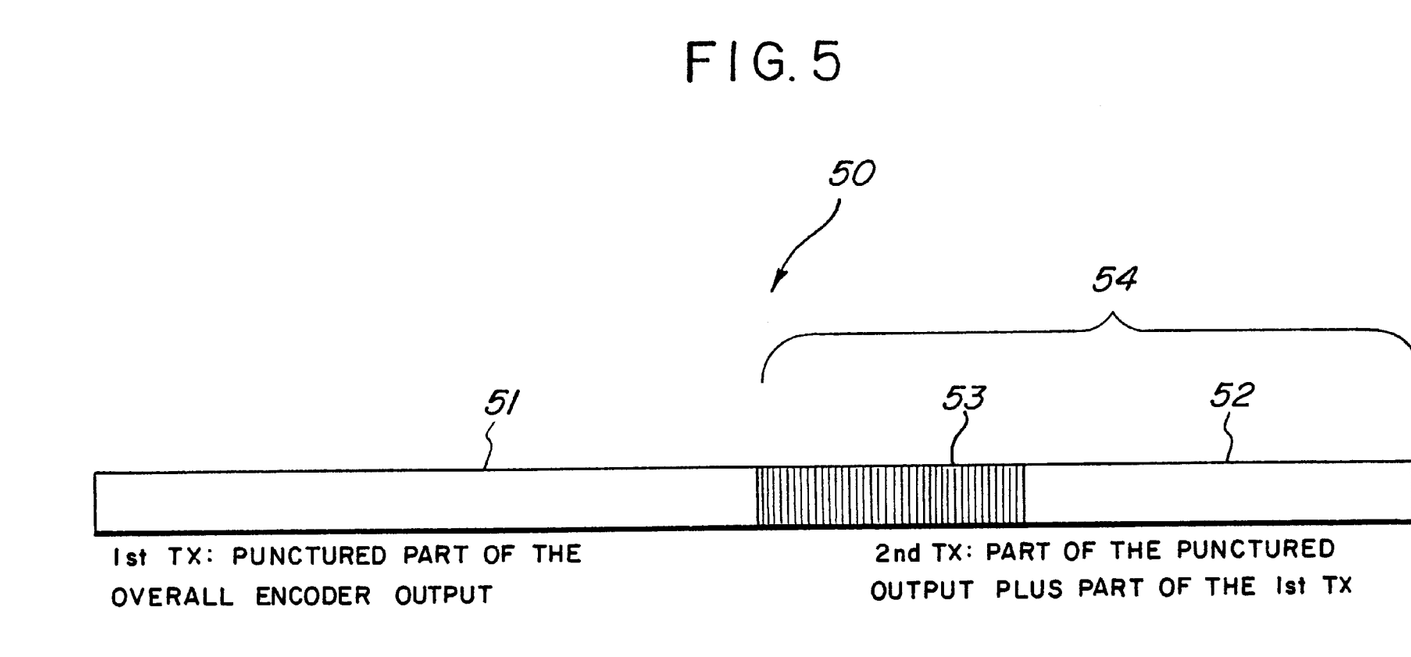
FIG. 5 shows a graphical depiction of two (2) serial data transmissions 50 used within the system of the second preferred embodiment of the present invention.

A graphical depiction of two (2) serial data transmissions 50 used within the system of the second preferred embodiment of the present invention is shown in FIG. 5. While the second preferred embodiment of the present invention is implemented using only two (2) transmissions, it is anticipated that further embodiments may be configured which may utilize a different number of transmissions and re-transmissions, and still fall within the scope of the present invention.

Additionally, while the second preferred embodiment of the present invention is implemented using the Parallel Concatenated Convolutional Coding (PCCC) system illustrated in FIG. 4, it is also anticipated that a Serial Concatenated Convolutional Coding system (not shown) may be used whereby an interleaver is placed at a punctured output of a first encoder The interleaver then feeds the interleaved signal into a second encoder which also provides a punctured output for transmission.

As shown in FIG. 5, the first transmission 51 used within the system of the second preferred embodiment of the present invention consists of a punctured part of the overall encoder output of the Turbo encoder illustrated in FIG. 4. The second preferred embodiment of the present invention then provides a second transmission 54 which is a combination of a re-transmission of part of the first transmission 52 and a new punctured output from the Turbo encoder 53.

In the second preferred embodiment of the present invention, the amount of the first transmission 51 which is re-transmitted 52 is set by a predetermined algorithm. For example, an algorithm may determine that the first thirty percent (30%) of the first transmission 51 should be re-transmitted 52 within the second transmission 54. Obviously, as you increase the amount of re-transmission 52, you increase the reliability as well as the complexity and the time necessary to decode two full frames of data 51, 54. When the amount of the retransmission 54 is identical to the first transmission 51, the system of the first preferred embodiment of the invention is being implemented. The goal is to decrease the amount of retransmission 53 while still maintaining a high level of reliability.

As can be seen from the illustration of FIG. 5, the second preferred embodiment is able to "augment" the signal processed by a decoding algorithm for the Soft Output Viterbi Algorithm (SOVA) by combining the first transmission 51 with the re-transmission 53. In this second preferred embodiment, the decoding algorithm repeatedly operates the SOVA upon the input, and an effective lower Turbo rate code is obtained within the decoding algorithm.

This second preferred embodiment is distinguishable from the re-transmission rake processing system of the first preferred embodiment, which simply combines similar bits of transmitted information in the multiple transmissions before performing the SOVA within the decoding processor. The effective lower Turbo rate code provided by the second preferred embodiment obtains a benefit in performance by raising the success rate of the received signals and increasing transmission reliability.

As an example, where there is an encoder which uses a Turbo coding rate of ¼, after the second transmission the effective decoding rate of an implementation of the second preferred embodiment of the present invention may become ⅙. In this example, the second transmission consists of four parts; two parts of the re-transmitted punctured first transmission and two parts of a new transmission. By combining the entire first transmission of four parts with the two parts of the re-transmitted punctured first transmission, the amount of information being processed, i.e., the "augmented" reception space, is six (6) parts yielding a ⅙ effective Turbo decoding rate.

The method of the second preferred embodiment of the present invention uses the encoding system shown in FIG. 4 to transmit signals over the air interface. Consider that each of the RSCC's 42, 44 have a Turbo rate code of ½, then upon puncturing alternative bits from each of the sets of encoder outputs 43, 46, the information bits along with the alternative redundancy bits from each of the outputs 43, 46 are transmitted. The effective overall Turbo coding rate becomes ½.

In the second transmission, the interleaved sequence of information bits is then transmitted together with the punctured symbols from each output. At the decoder the effective coding rate, after the second transmission, becomes ⅓, i.e., yielding additional coding gain. Thus, the system is able to accomplish enhanced reception with minimal additional hardware or complexity over known systems since the SOVA decoder block required by the Turbo code is essentially the same.

Figure 6:
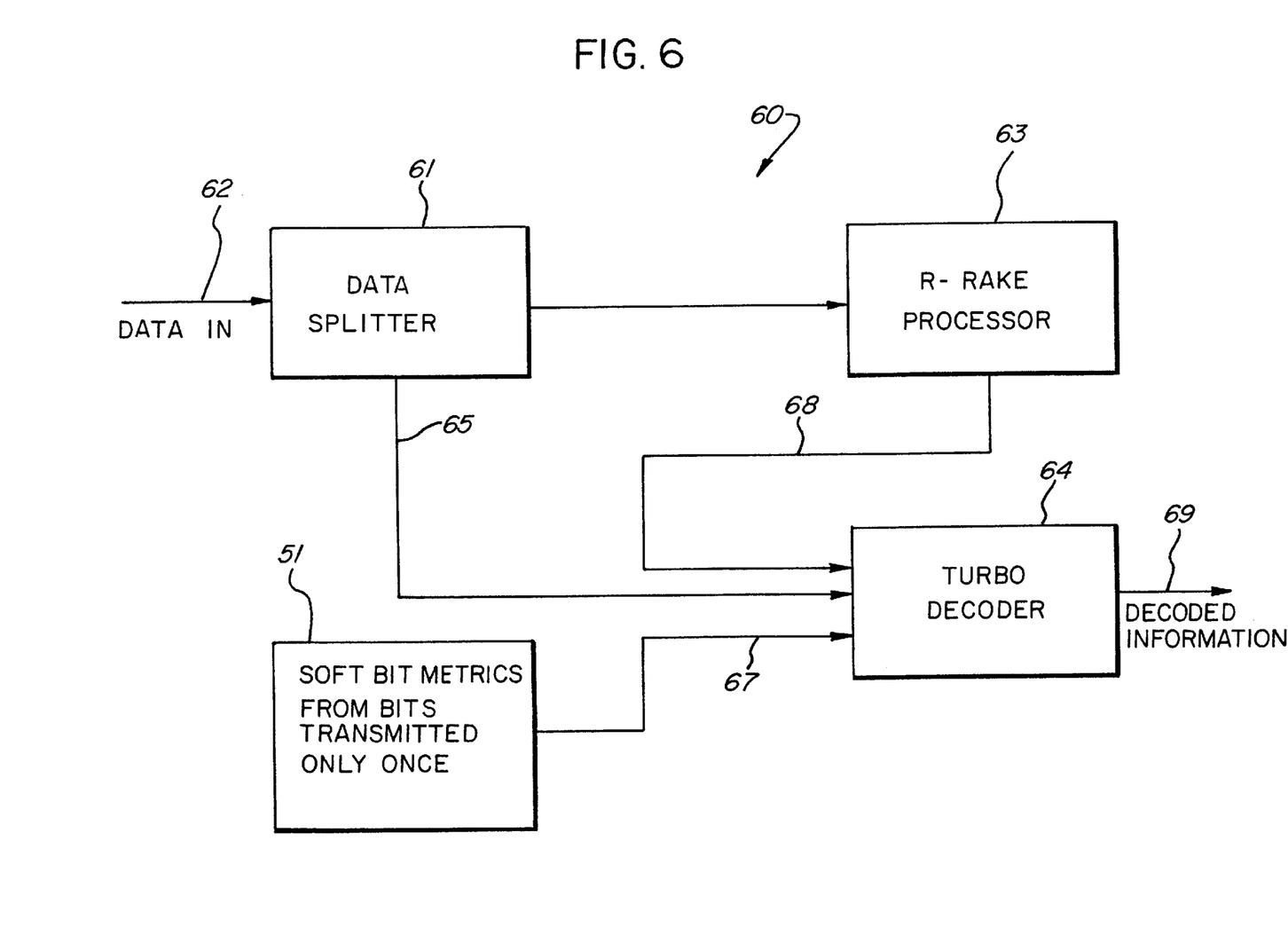
FIG. 6 shows a graphical block diagram depiction of the Turbo decoder processing system 60 of the second preferred embodiment of the present invention.

The Turbo decoder processing system 60 of the second preferred embodiment of the present invention is illustrated in block diagram form in FIG. 6.

As is shown in FIG. 6, soft bit metrics received within the first transmission 51 are fed directly into a Turbo decoder 64 along input 67. Data received from the second transmission 54 is fed into the data splitter 61 at the input 62. The data splitter 61 then divides the data into its component parts, i.e., the punctured part 53 or the re-transmitted part 52, as illustrated in FIG. 5.

The re-transmitted part 52 is then fed to a processor 63 for ordinary rake processing with corresponding bits from the previous first transmission (51 in FIG. 5) as described above. In the ordinary rake processor 63, the processor 63 combines the similar bits transmitted in each of the multiple transmissions before providing the rake processed output signal for the Soft Output Viterbi Algorithm (SOVA) within the Turbo decoder 64.

The output of the ordinary rake processor 63 is fed into the Turbo decoder 64 along input 68. The new punctured part of the second transmission is sent by the data splitter 61 directly to a Turbo decoder 64 along path 65.

While this second preferred embodiment of the present invention only uses two (2) transmissions for any one signal, it is anticipated that further embodiments falling within the scope of the invention may use multiple Turbo re-transmissions and that each of the re-transmissions will be fed along input 62 into the decoder 60.

The Turbo decoder 64 implements the Soft Output Viterbi Algorithm (SOVA) upon each of the inputs repeatedly. However, the SOVA is implemented upon the "augmented" reception space, which is the combined first transmission 51 and the rake processed re-transmission 68. The decoded information is then fed by Turbo decoder 64 along output 69 for use. By implementing the SOVA in this manner, the second preferred embodiment of the present invention is able to obtain a lower effective Turbo rate code and thereby obtain performance benefits while maintaining minimal complexity.

Those skilled in the art will appreciate that various adaptations and modifications of the just described preferred embodiment can be used and configured without departing from the scope and spirit of the invention. Therefore, it is to be understood that, within the scope of the appended claims, the invention may be practiced other than as specifically described herein.

What is claimed is:

1. A multiple access system of communication, comprising:

a Turbo encoder for Turbo encoding signal representations of packets of information;

a transmitter for transmitting a first signal representation of a packet of information and a second signal which include a re-transmission of part of the first signal and a new signal representation of the packet of information;

a Turbo decoder processor;

a first input system for receiving soft bit metrics within the first transmitted signal representation and inputting the metrics into the Turbo decoder processor; and a second input system for receiving the second signal and splitting the second signal into a new signal representation and a re-transmitted part, the new signal representation being directly inputted into the Turbo decoder processor and the re-transmitted part being provided to a rake processor for combination with corresponding data from the first signal representation, the rake processor providing an output to the Turbo decoder processor.

2. A method of communication within a multiple access system of communication, comprising the steps of:

Turbo encoding signal representations of packets of information;

transmitting a first signal representation of a packet of information and a second signal which includes a re-transmission of part of the first signal and a new signal representation of the packet of information;

receiving soft bit metrics within the first transmission and inputting the metrics into a Turbo decoder processor;

receiving the second signal and splitting the second signal into a new signal representation and a re-transmitted part;

inputting the new signal representation directly into the Turbo decoder processor;

combining the re-transmitted part with corresponding data from the first signal representation in a rake processor; and providing the combination to the Turbo decoder processor.

3. A multiple access communication system comprising:

a Turbo encoder for Turbo encoding signal representations of packets of information;

a transmitter for transmitting a punctured output from the Turbo encoder as a first transmission and transmitting a combination of part of the first punctured output from the Turbo encoder and a new punctured output from the Turbo encoder as a second transmission;

a Turbo decoder;

an input system for feeding soft bit metrics within the received first transmission to the Turbo decoder;

a data splitter for splitting the second transmission into its parts and feeding the new punctured output part directly to the Turbo decoder; and a rake processor for combing the first punctured output part from the data splitter with corresponding bits of the first transmission, and feeding the combination to the Turbo decoder.

4. The system of claim 3, wherein the turbo decoder performs a Soft Output Viterbi Algorithm (SOVA) upon each of the inputs to the Turbo decoder.

5. A method of communication within a multiple access system, comprising the steps of:

Turbo encoding signal representations of packets of information;

transmitting a punctured output from the turbo encoding step as a first transmission;

transmitting a part of the first transmission in combination with a new punctured output from the turbo encoding step as a second transmission;

feeding the soft bit metrics within the received first transmission to a Turbo decoder;

splitting the received second transmission into two parts;

feeding the new punctured output part directly to the Turbo decoder;

combining the part of the first transmission part from the splitting step with corresponding bits of the received first transmission using rake processing; and feeding the resulting rake processed combination to the Turbo decoder.

* * * * *